Jan. 13, 1970   C. W. SEAVER   3,489,490
HINGES FOR SPECTACLE FRAMES AND THE COMBINATION
Filed Dec. 8, 1966   2 Sheets-Sheet 1

INVENTOR.
CHARLES W. SEAVER
BY
ATTORNEY

Jan. 13, 1970  C. W. SEAVER  3,489,490
HINGES FOR SPECTACLE FRAMES AND THE COMBINATION
Filed Dec. 8, 1966  2 Sheets-Sheet 2

INVENTOR.
CHARLES W. SEAVER
BY
ATTORNEY

United States Patent Office 3,489,490
Patented Jan. 13, 1970

3,489,490
HINGES FOR SPECTACLE FRAMES AND THE COMBINATION
Charles W. Seaver, Needham, Mass., assignor, by mesne assignments, to American Optical Corporation, a corporation of Delaware
Filed Dec. 8, 1966, Ser. No. 600,142
Int. Cl. G02c 5/22
U.S. Cl. 351—153
2 Claims

ABSTRACT OF THE DISCLOSURE

Hinge plate fixed to a spectacle endpiece by an anchor member. The anchor member has an apertured tongue extending beyond the length of the plate and wing portions beneath the plate all inserted into the endpiece. Material of the endpiece displaced into the apertured tongue and between the wing portions and plate lock the plate against pull-out forces, lateral and torsional displacement. A mass production system includes a continuous process of fabricating and assembling the components of the hinge and driving it into plastic spectacle parts by utilizing heat or ultrasonic vibrations.

---

This invention relates to plastic spectacle frames and has particular reference to improvements in hinges therefor, their manufacture and installation.

An object of the present invention is to provide for improved simple and economical high quality hinging of temples to spectacle frame fronts.

To attain the aforesaid object and others which may appear from the following detailed description in accordance with one aspect of the present invention, I provide a mass production system which prepares hinge components for installation in plastic temple and front sections of spectacle frames and installs the same in a continuous sequence of operations.

The system comprises employment of a strip of thin metallic material which is punched, coined and shaped along its length to form a series of interconnected anchor members by means of which hinge components are ultimately anchored to temples and front sections of spectacle frames.

The strip is moved longitudinally intermittently through die means which, in recognized fashion, performs the aforementioned forming operations thereon during one or more scheduled hold periods in its movement. During one such period, a hinge component is affixed (e.g. spot welded) to each anchor member subsequent to emergence of the anchor member from the die. Also in timed relationship with the same or another hold period, anchor members having their respective hinge components affixed thereto are sheared from the strip and each is thereafter moved into alignment with a temple or an end section of the frame front intended to receive the same.

The receiving part of the spectacle is slotted generally as is customary for receiving conventional hinge components per se with an additional guide slot for the anchor member. Leading and trailing portions of the anchor member are driven directly into the material of the receiving part of the spectacle which surrounds stud slots to a point where the attached hinge component assumes its proper interfitted relationship within the receiving slot therefor. Thereupon, portions of the material which become displaced by the anchor member assume an interlocking relationship with the anchor member to effect permanent implantation thereof.

The peculiar design of the anchor member, which will be described in detail hereinafter, provides the subject hinge installation with permanent, exceptionally high resistance to torsional stresses, lateral bending, pull-out forces and other abuses to which hinges of spectacle frames are commonly subjected during use.

Figure 1:
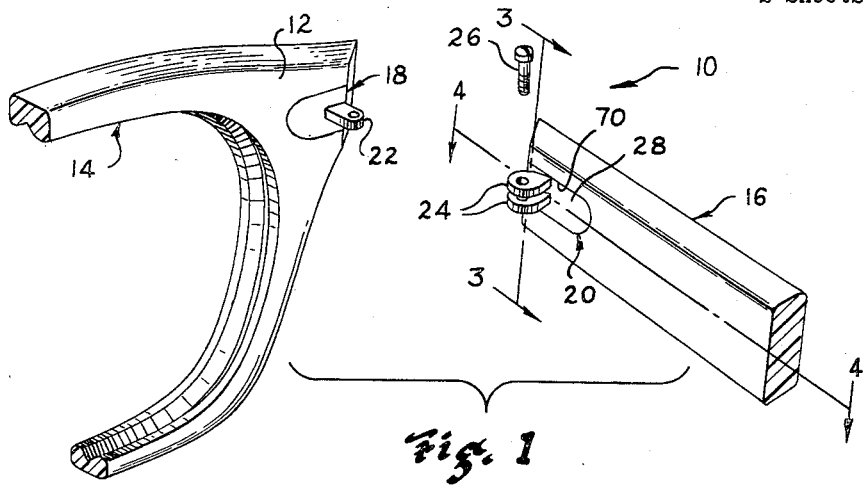
Figure 2:
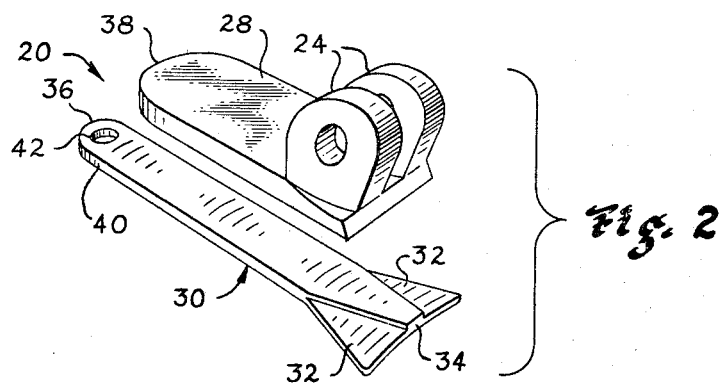
Figure 3:
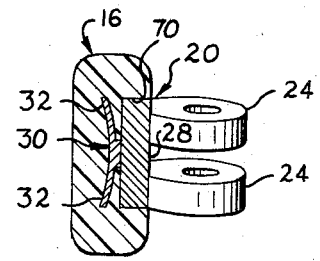
Figure 4:
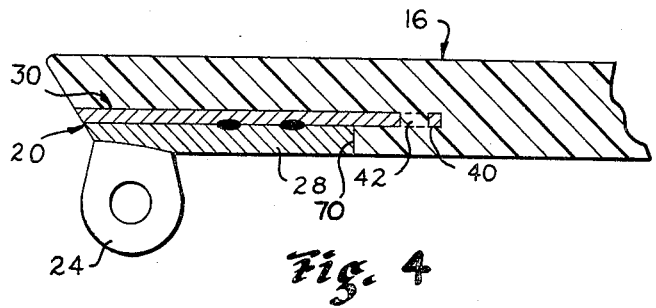
Figure 5:
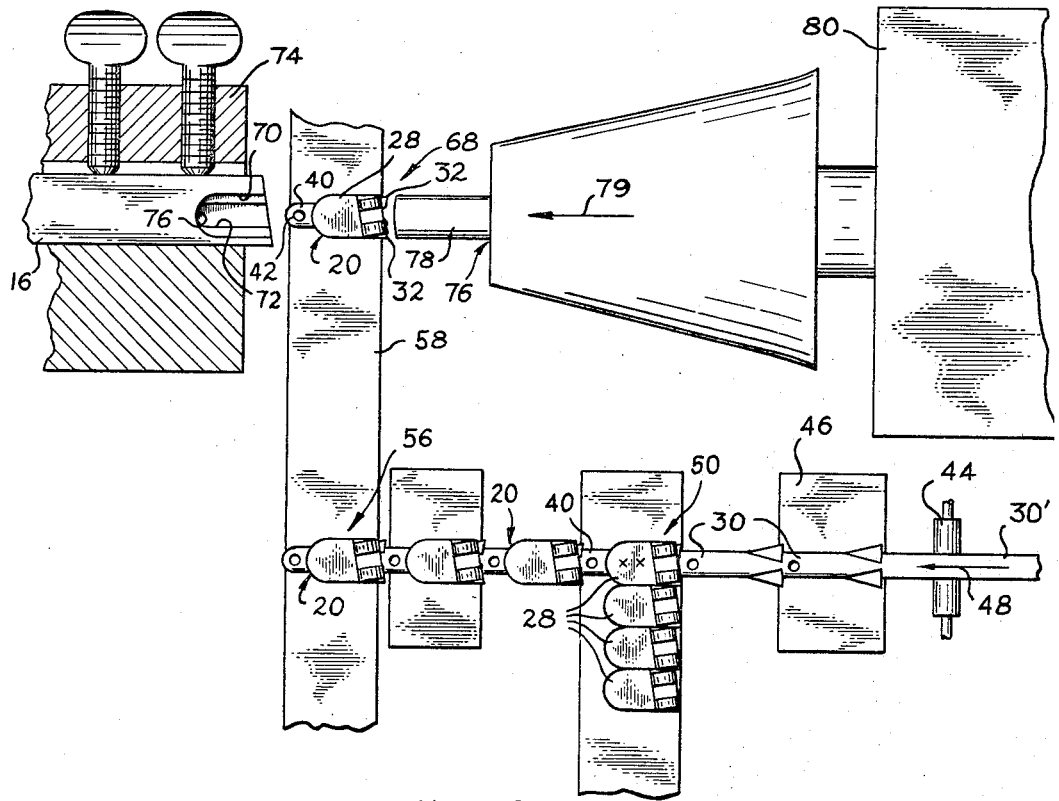
Figure 6:
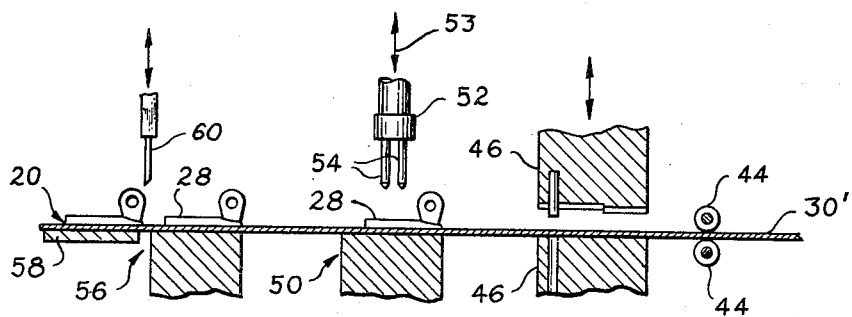

The present invention will be more fully understood by reference to the following detailed description which is accompanied by a drawing in which FIG. 1 depicts, in fragmentary rear perspective, an exemplary spectacle end piece with front and temple portions thereof separated for clear illustration of an embodiment of the invention;

FIG. 2 is a greatly enlarged perspective view of one embodiment of the improved hinge construction of my invention with component parts thereof separated from one another for clarity of illustration;

FIGS. 3 and 4 are enlarged cross-sectional views taken on lines 3—3 and 4—4 respectively of FIG. 1;

FIG. 5 is a diagrammatic plan view of one system of operations useful in fabricating and installing the subject hinge constructions according to principles of the invention; and FIG. 6 is an elevational view also in diagrammatic form of a portion of the same system of operations.

Referring now to FIG. 1 there is shown spectacle endpiece 10 which comprises the temporal end portion 12 of spectacle front 14 and of temple 16. Endpiece 10 is illustrated with front 14 and temple 16 disconnected to more clearly illustrate hinge leaves 18 and 20 having ears 22 and 24 respectively which are normally interfitted and interconnected by pintle 26. Pintle 26 may, as illustrated, comprise a screw which is ultimately extended through openings in the interfitted ears and threaded into the lowermost one thereof. Ears 22 and 24, when interfitted, form what is referred to in the art as a "hinge barrel." Herein a three-barrel hinge, i.e. having three hinge ears, is shown for simplicity of illustration. It should be apparent, however, that the present invention is not in any sense limited to such construction. Five, seven or greater numbers and/or other recognized forms of hinge ears may be used conjunctively with the hinge construction herein contemplated.

Details of the construction of hinge leaf 20 and its installation are illustrated in FIGS. 2 through 6 all of which are applicable to hinge leaf 18. Leaf 18 differs only immaterially in its construction, i.e. number of ears and the direction of pantoscopic tilt thereof. It is installed in front 14 in the same manner as leaf 20 is installed in temple 16.

Leaf 20 comprises hinge plate 28 (see FIG. 2) which, per se, will be recognized as being of the type usually, but not in this case, drilled and pinned or riveted directly to spectacle temples. In this case, plate 28 is provided with anchor 30 to which it is spot welded or otherwise attached as shown in FIGS. 3 and 4.

Anchor 30 is much thinner and generally narrower but of greater length than plate 28. It has laterally extending delta-shaped wings 32 at one end 34 and a generally rounded opposite end 36 (see FIG. 2) which extends beyond end 38 of plate 28 to form tongue 40 (see FIG. 4). Wings 32 arc downwardly away from plate 28 with the same curvature, preferably but not necessarily, extending along the full length of anchor 30. Tongue 40 is provided with opening 42.

From the following details of the process contemplated herein for fabricating and installing hinge leaf 20 in temple 16, it will become apparent that tongue 40 functions as means for preventing longitudinal displacement and/or lateral pulling away of leaf 20 from temple 16 while wings 32 prevent torsional displacement thereof and also assist in resisting lateral displacement of leaf 20.

Hinge leaf 20 is fabricated and installed as follows:

A continuous strip 30' of thin (e.g. .020 inch) sheet metal of a width approximately equal to that desired of tongue 40 (e.g. .093 inch) is fed through flattening and straightening rollers 44 (see FIGS. 5 and 6) into die 46.

During a hold period in die 46 the section of strip 30' therein is coined, punched and shaped to form respectively the wings 32, opening 42 and arcuate shape depicted in FIGS. 2 and 3 of anchor 30. Die 46 is only diagrammatically illustrated herein but it may be of any recognized single action or progressive type which will perform the coining, punching and shaping in a single or series of operations respectively without severing or otherwise disconnecting anchor 30 from strip 30'.

Following the die work, strip 30' is moved the length of anchor 30 in the direction of arrow 48 and again coined, punched and shaped to form a second anchor 30 interconnected with the first, then a third anchor 30, and so on to form a succession of interconnected anchors 30.

Upon reaching station 50, the first formed anchor 30 and each one thereafter is provided with a hinge plate 28 during successive hold periods of strip 30' in die 46.

Each plate 28 is centered upon its respective anchor 30 with tongue 40 exposed. It is fastened in place, e.g. by spot-welding. In FIG. 6, electric spot-welder 52 having electrodes 54 is diagrammatically illustrated as being actuable toward and away (see arrow 53) from plate 28 for effecting the fastening operation.

At station 56 each of hinge leaves 20 reaches cross-feed conveyer 58 and, during one of the aforementioned hold periods, is sheared from strip 30'. Shearer 60 is diagrammatically illustrated in FIG. 6.

Conveyor 58, operating intermittently in time sequence with the aforementioned hold periods in the movement of strip 30', moves hinge leaves 20 individually to station 68 for insertion into temple 16.

Each temple 16 which is intended to receive a hinge leaf 20 is provided with the customary form of slot 70 (FIG. 5) of a shape and size corresponding to that of plate 28. Additionally, the bottom of slot 70 is provided with guide channel 72 shorter than, but of a depth and width approximately equal to, corresponding dimensions of tongue 40 of hinge leaf 20.

With clamp 74 holding temple 16 fixedly in alignment with hinge leaf 20 (FIG. 5), driver 76 pushes leaf 20 into slot 70 to the point where tongue 40 engages blunt end 76 of the slot. Continued driving of hinge leaf 20 forces tongue 40 and wings 32 into correspondingly adjacent portions of the material of temple 16 up to the point where plate 28 assumes its proper interfitted relationship within its receiving slot 70 as shown in FIGS. 1, 3 and 4.

Such driving of tongue 40 and wings 32 into the material of temple 16 causes displacement of the material occupied thereby into opening 42 (see FIG. 4), along the sides of anchor 30 between it and plate 28 and along the arched underside of anchor 30 (see FIG. 3).

Thus, permanent implantation of hinge leaf 20 is achieved. The displaced plastic material which fills opening 42 functions to pin leaf 20 in place against longitudinal withdrawal. The embedded tongue and tips of wings 32 prevent lateral displacement of leaf 20 and the arcuate spread of the wings prevents torsional displacement of leaf 20 during subsequent use thereof. Displaced plastic material along the sides and beneath anchor 30 provides added gripping of the installation.

Preferably, the driving of hinge leaf 20 is effected ultrasonically with the combination of driving tool 78 and a conventional ultrasonic transducer 80 (FIG. 5) which ultrasonically vibrates tool 78 as it moved in the direction of arrow 79. Alternatively, the hinge receiving end of temple 16 and/or leaf 20 may be heated and leaf 20 driven without ultrasonic vibration.

The shallowness of anchor 30 is such as to prevent protrusion of wings 32 or other parts thereof laterally through the thickness of temple 16. Its arcuate shape (see FIG. 3) in providing space in channel 72 for receiving the greater portion of plastic material displaced by tongue 40 and tips of wings 32 prevents appreciable, if any deformation of temple 16. Thus, there is achieved a substantially smooth unmarred outer surface of temple 16 with hinge plate 20 and all attachment means therefor (anchor 30) hidden from view when in use. Similarly, hinge leaf 18 may be installed in spectacle front 14 of endpiece 10.

It should be understood that various refinements of the hinge fabricating and installation system shown diagrammatically and described herein (e.g. plate 28 and anchor 30 locating devices at station 50, automatic feeding equipment at this and other stations, timing and/or triggering means for initiating and the various operations) are not illustrated. Such expedients being readily recognizable by the artisan should not require detailed explanation or illustration for a clear understanding of the present invention.

It is further pointed out, that hinge leaves such as 20 (i.e. including plate 28, ears 24 and anchor 30) may, if desired, be die cast in their entirety and thereafter driven into the spectacle endpiece structure at a station such as 68 described hereinabove. In such case, a recognized form of die casting means would be substituted for all but station 68 in FIG. 5. Conveyer 58 may be used to receive such die cast hinge leaves and position same for driving at station 68.

I claim:

1. A spectacle hinge leaf comprising:

a hinge plate having a number of hinge ears extending laterally from one side of the plate adjacent a first end thereof;

an anchor member integral with said plate and extending along a side of the plate opposite to said one side thereof, the extension of said anchor member being from a point adjacent said first end of said plate to a terminus substantially beyond the opposite end of the plate, said anchor member being of a width substantially less than the width of said plate throughout the major portion of its length and having an aperture adjacent its terminus, and laterally extending wing portions spaced away from said plate adjacent said first end thereof whereby, when said anchor member is forced into plastic material of a spectacle endpiece, portions of said material will displace into said aperture and between said wing portions and plate to respectively lock said hinge leaf against longitudinal withdrawal and lock said leaf against lateral and torsional displacement in said endpiece.

2. The combination of a spectacle frame having an endpiece of plastic material and at least one hinge component anchored in said endpiece; said hinge component comprising:

a hinge plate having a number of hinge ears extending laterally from one side of the plate adjacent a first end thereof;

an anchor member imbedded in said plastic material, said member being integral with said plate and extending along a side of the plate opposite to said one side thereof, the extension of said anchor member relative to said plate being from a point adjacent said first end thereof to a terminus substantially beyond the opposite end of the plate, said anchor member being of a width substantially less than the width of said plate throughout the major portion of its length and having an aperture adjacent said terminus, and laterally extending wing portions spaced away from said plate adjacent said first end thereof, said material of said endpiece being extended through said aperture in said anchor member and between said wing portions and plate whereby said material in said aperture locks said hinge component against longitudinal withdrawal from said endpiece and said material between said wing portions and plate locks the hinge component against lateral and torsional displacement.

References Cited

UNITED STATES PATENTS

| | | | |
|---|---|---|---|
| 1,687,960 | 10/1928 | Welsh. | |
| 1,718,986 | 7/1929 | Searles | 351—153 |
| 1,729,901 | 10/1929 | Simonds et al. | 351—178 |
| 2,326,971 | 8/1943 | Rey | 351—153 |

FOREIGN PATENTS 1,210,031  9/1959  France.

DAVID SCHONBERG, Primary Examiner
JOHN W. LEONARD, Assistant Examiner

U.S. Cl. X.R.

16—128; 29—20; 264—249; 351—121, 178